US012561736B2

(12) United States Patent
Isaacs et al.

(10) Patent No.: US 12,561,736 B2
(45) Date of Patent: *Feb. 24, 2026

(54) INTELLIGENT SYSTEMS AND METHODS FOR ALGORITHMICALLY MANAGING DISTRIBUTION OF CERTIFICATES OF TRANSPORTATION

(71) Applicant: BNSF Railway Company, Fort Worth, TX (US)

(72) Inventors: Christian Isaacs, Topeka, KS (US); Michael Vierling, Topeka, KS (US)

(73) Assignee: BNSF Railway Company, Fort Worth, TX (US)

( * ) Notice: Subject to any disclaimer, the term of this patent is extended or adjusted under 35 U.S.C. 154(b) by 593 days.

This patent is subject to a terminal disclaimer.

(21) Appl. No.: 18/049,697

(22) Filed: Oct. 26, 2022

(65) Prior Publication Data

US 2023/0085824 A1 Mar. 23, 2023

Related U.S. Application Data

(63) Continuation-in-part of application No. 17/804,398, filed on May 27, 2022, which is a continuation of application No. 16/177,124, filed on Oct. 31, 2018, now abandoned.

(60) Provisional application No. 62/579,660, filed on Oct. 31, 2017.

(51) Int. Cl.
G06Q 30/02 (2023.01)
G06Q 10/02 (2012.01)
G06Q 30/08 (2012.01)
G06Q 50/40 (2024.01)

(52) U.S. Cl.
CPC ............. *G06Q 30/08* (2013.01); *G06Q 10/02* (2013.01); *G06Q 50/40* (2024.01)

(58) Field of Classification Search
CPC ......... G06Q 30/08; G06Q 10/02; G06Q 50/40
See application file for complete search history.

(56) References Cited

U.S. PATENT DOCUMENTS 6,035,289 A 3/2000 Chou et al.
6,219,653 B1 4/2001 Oneill et al.
(Continued)

*Primary Examiner* — Breffni Baggot
(74) *Attorney, Agent, or Firm* — Whitaker Chalk Swindle & Schwartz PLLC; Enrique Sanchez, Jr.

(57) ABSTRACT

An apparatus, a method, and a non-transitory computer readable medium provide for intelligently managing distribution of certificates of transportations (COTs). In embodiments, an application server is configured to execute an algorithmic distribution application configured to manage distribution of available COTs based on a plurality of bid requests received from bidders. The algorithmic distribution application may not merely determine a winner of an online auction by determining a bidder that placed the largest bid, but may include functionality to intelligently determine whether all available COTs have been requested or not, and to adjust the allocation of the available COTs to the requesting bidders according to the availability of the COTs, as well as to dynamically determine a price of the allocated COTs, which may not always be a maximum bid of the winning but may be adjusted based on the allocation of the available COTs to the requested bids.

20 Claims, 6 Drawing Sheets

(56) References Cited

U.S. PATENT DOCUMENTS

| | | | |
|---|---|---|---|
| 7,006,987 B1 * | 2/2006 | Xie | G06Q 30/08 705/26.3 |
| 7,542,920 B1 | 6/2009 | Lin-Hendel | |
| 2001/0032175 A1 * | 10/2001 | Holden | G06Q 40/04 705/26.1 |
| 2002/0111892 A1 | 8/2002 | Sharp et al. | |
| 2002/0128948 A1 | 9/2002 | Wiesehuegel et al. | |
| 2003/0216993 A1 * | 11/2003 | Goldwerger | G06Q 30/08 705/37 |
| 2004/0098333 A1 | 5/2004 | Meesseman | |
| 2004/0128224 A1 | 7/2004 | Dabney et al. | |
| 2006/0085300 A1 | 4/2006 | Green | |
| 2007/0100739 A1 | 5/2007 | Cui et al. | |
| 2007/0106595 A1 * | 5/2007 | Cui | G06Q 40/04 705/37 |
| 2007/0143206 A1 | 6/2007 | Cui et al. | |
| 2011/0246212 A1 | 10/2011 | Barnes | |
| 2012/0084171 A1 | 4/2012 | Adair et al. | |
| 2013/0132440 A1 * | 5/2013 | Carlson | H04L 67/306 707/792 |
| 2017/0140371 A1 | 5/2017 | Forzley et al. | |
| 2018/0094961 A1 | 4/2018 | Krueger et al. | |
| 2019/0130477 A1 * | 5/2019 | Isaacs | G06Q 30/08 |

* cited by examiner

INTELLIGENT SYSTEMS AND METHODS FOR ALGORITHMICALLY MANAGING DISTRIBUTION OF CERTIFICATES OF TRANSPORTATION

CROSS-REFERENCE TO RELATED APPLICATIONS

The present application is a Continuation-in-Part of U.S. patent application Ser. No. 17/804,398, filed Jul. 1, 2022, which is a Continuation application of U.S. patent application Ser. No. 16/177,124, filed on Oct. 31, 2018, which claims the benefit of U.S. Provisional Patent Application Ser. No. 62/579,660, filed on Oct. 31, 2017, the entireties of which are incorporated herein by reference for all purposes.

TECHNICAL FIELD

The present disclosure relates in general to railroad operations, and in particular, to intelligent systems and methods for algorithmically managing distribution of certificates of transportation.

BACKGROUND

Managing distribution of assets can be a very challenging undertaking, as there are a large number of disparate considerations that are taken into account when determining where, how, to whom those assets are distributed. Although some management solutions have been developed, these solutions are not viable or feasible to address every situation. For example, in the field of railroad operations, management the distribution of assets is of particular importance, as the railroad may rely on the details of the distribution to develop schedules and customers may rely on the assets to be able to transport assets.

In particular, in railroad operations, some form of asset distribution is performed using certificates of transportation (COTs). A COT may be used to represent a commodity. Typically, a COT may represent one or more cars of a commodity (e.g., one or more grain cars) that a railroad may distribute to customers. COTs are classified into seven different types depending on the commodity, redeem period, price, and car amount. In a typical implementation, COTs may be sold to customers through an online auction, which provides a convenient and fair method of distribution. Generally, the type of COT determines how many cars the COT is worth. A COT also may have restrictions on when it can be used (specific month/year and period in the month, first, middle, or last).

However, online auctions, and in particular management of online auctions for distributing COTs may give rise to least two significant challenges. The first challenge may include determining how many of the COTs requested in an auction bid are won. For example, each COT could be treated individually instead of as a group, each bidder could be allowed to only win the exact number of COTs requested, or each bidder could be allowed to win less than the number of COTs requested in the auction bid. The second challenge may include determining the amount each bidder is paying for a COT. For example, determinations must be made as to when to account for increment and when to account for bid time, what the priorities for increment and bid time should be, and how to handle proxy bidding.

Current systems for managing distribution of COTs via auctions may be too simple to handle the challenges described above. Lacking intelligent functionality, these current systems may allow bids and may even allow determining a winner, but are unable to make intelligent determinations as to allocations of COTs when the number of COTs available and/or requested may be different and may not align, and/or as to intelligently determining pricing for a COT.

SUMMARY

The present disclosure achieves technical advantages as systems, methods, and computer-readable storage media that provide functionality for intelligently managing distribution of certificates of transportations (COTs). The present disclosure provides for a system integrated into a practical application with meaningful limitations that may enable the algorithmic management of distribution of available COTs via online auctions. In particular embodiments, a system includes a plurality of user terminals, a network, and an application server functioning as a COT processing system. The plurality of user terminals each including a display screen for presenting a graphical user interface and output information. The network may be configured to provide communication functionality to other components of the system, such as between the plurality of user terminals and the application server. The application server functioning as a COT processing system may be operable to perform execution of an algorithmic distribution application configured to manage distribution of the available COTs based on a plurality of bid requests received from a plurality of bidders. The algorithmic distribution application may include functionality to not merely determine a winner of an online auction by determining a bidder that placed the largest bid, but rather may include functionality to intelligently determine whether all available COTs have been requested or not, and to adjust the allocation of the available COTs to the requesting bidders according to the availability of the COTs, as well as to dynamically determine a price of the allocated COTs, which may not always be a maximum bid of the winning bid (e.g., as in a typical auction system) but may be adjusted based on the allocation of the available COTs to the requested bids. In this manner, the techniques disclosed herein do not merely store, organize, and compare data, but instead addresses an internet and computer centric challenge of COTs distribution via online auctions when available offered assets do not neatly match to requested assets. As such, the techniques disclosed herein represent more than a mere implementation of an abstract idea into a computer, but represents a technical improvement to current COTS distribution management systems and/or to online auction systems.

Accordingly, the present disclosure discloses concepts inextricably tied to computer and internet technology such that the present disclosure provides the technological benefit of providing a mechanism for intelligently managing distribution of COTs via online auctions. The present disclosure goes beyond a mere implementation of a manual process into a computer, providing a mechanism that is rooted in technology for managing various aspects of an online auction, including allocation of available COTs to requested COTs and dynamic adjustment of pricing based on the allocations. The present disclosure can address the current challenges with COTS distribution systems, namely current COTs online auctions systems, such as determining how many of the COTs requested in an online auction bid are available and/or won and determining the amount each bidder is to pay for a won COT, by providing a mechanism that allocates available COTs to bid requests based on a number of available COTs, and dynamically adjusting the price of COTs based on whether all requested COTS are allocated to winning bids.

The present disclosure solves the technological problem of a lack of technical functionality for intelligently managing distribution of COTs via online auctions. The technological solutions provided herein, and missing from conventional systems, are more than a mere application of a manual process to a computerized environment, but rather include functionality to implement a technical process to supplement current implementations of COTs distribution systems, and in particular COTs online auctions systems. In doing so, the present disclosure goes well beyond a mere application the manual process to a computer.

It is an object of the disclosure to provide a system for intelligently managing distribution of COTs via online auctions. It is a further object of the disclosure to provide a method of intelligently managing distribution of COTs via online auctions. It is still a further object of the disclosure to provide a computer-based tool for intelligently managing distribution of COTs via online auctions. These and other objects are provided by the present disclosure, including at least the following embodiments In one particular embodiment, a method of intelligently managing distribution of COTs via online auctions is provided. The method includes receiving a plurality of bid requests from a plurality of bidders, each bid request of the plurality of bid requests requesting one or more COTs of a plurality of available COTs for distribution. In embodiments, each of the one or more COTs represents an underlying commodity, and each bid of the plurality bid requests includes a minimum bid amount and a maximum bid amount corresponding to each of the one or more COTs. The method also includes executing an algorithmic distribution application configured to manage distribution of the plurality of available COTs based on the plurality of bid requests. In embodiments, executing the algorithmic distribution application includes aggregating each of the plurality of bid requests from the plurality of bidders into a list of bid requests and determining whether a total number of COTs requested in the plurality of bid requests is more than a total number of COTs in the plurality of available COTs. In embodiments, executing the algorithmic distribution application includes, when the total number of COTs requested in the plurality of bid requests is not more than the total number of COTs in the plurality of available COTs, allocating COTs of the plurality of available COTs to each of the plurality of bidders based on the one or more COTs requested in the bid request received from each respective bidder of the plurality of bidders, and determining a price for each of the allocated COTs based on the minimum bid amount in the bid request corresponding to the allocated COT for the bid request. In embodiments, executing the algorithmic distribution application includes, when the total number of COTs requested in the plurality of bid requests is more than the total number of COTs in the plurality of available COTs, sorting the list of bid requests based on the maximum bid amount in each of the bid requests in the list of bid requests, further sorting the list of bid requests based on a placement time each of the bid requests in the list of bid requests was placed such that a first bid request having a maximum bid amount equal to a maximum bid amount of a second bid request and a placement time earlier than the second bid request is sorted above the second bid request, allocating COTs of the plurality of available COTs to each bid request in the list of bid requests based on the sorting order of each bid request, determining a price for each of the COTS allocated to each bid request in the list of bid requests, where determining the price includes determining the price for each of the COTS allocated to each bid request in the list of bid requests based on a first loser's bid amount when all COTs requested in the plurality of bid requests have a corresponding winning bid in the list of bid requests, and determining the price for each of the COTS allocated to each bid request in the list of bid requests based on a last winner's bid amount when all COTs requested in the plurality of bid requests do not have a corresponding winning bid in the list of bid requests. In embodiments, executing the algorithmic distribution application includes distributing the allocated COTs in the list of bid requests to each bidder associated with each bid request in the list of bid request to which a COT has been allocated.

In another embodiment, a computer-based tool for intelligently managing distribution of COTs via online auctions is provided. The computer-based tool may include non-transitory computer readable media having stored thereon computer code which, when executed by a processor, causes a computing device to perform operations. The operations include receiving a plurality of bid requests from a plurality of bidders, each bid request of the plurality of bid requests requesting one or more COTs of a plurality of available COTs for distribution. In embodiments, each of the one or more COTs represents an underlying commodity, and each bid of the plurality bid requests includes a minimum bid amount and a maximum bid amount corresponding to each of the one or more COTs. The operations also include executing an algorithmic distribution application configured to manage distribution of the plurality of available COTs based on the plurality of bid requests. In embodiments, executing the algorithmic distribution application includes aggregating each of the plurality of bid requests from the plurality of bidders into a list of bid requests and determining whether a total number of COTs requested in the plurality of bid requests is more than a total number of COTs in the plurality of available COTs. In embodiments, executing the algorithmic distribution application includes, when the total number of COTs requested in the plurality of bid requests is not more than the total number of COTs in the plurality of available COTs, allocating COTs of the plurality of available COTs to each of the plurality of bidders based on the one or more COTs requested in the bid request received from each respective bidder of the plurality of bidders, and determining a price for each of the allocated COTs based on the minimum bid amount in the bid request corresponding to the allocated COT for the bid request. In embodiments, executing the algorithmic distribution application includes, when the total number of COTs requested in the plurality of bid requests is more than the total number of COTs in the plurality of available COTs, sorting the list of bid requests based on the maximum bid amount in each of the bid requests in the list of bid requests, further sorting the list of bid requests based on a placement time each of the bid requests in the list of bid requests was placed such that a first bid request having a maximum bid amount equal to a maximum bid amount of a second bid request and a placement time earlier than the second bid request is sorted above the second bid request, allocating COTs of the plurality of available COTs to each bid request in the list of bid requests based on the sorting order of each bid request, determining a price for each of the COTS allocated to each bid request in the list of bid requests, where determining the price includes determining the price for each of the COTS allocated to each bid request in the list of bid requests based on a first loser's bid amount when all COTs requested in the plurality of bid requests have a corresponding winning bid in the list of bid requests, and determining the price for each of the COTS allocated to each bid request in the list of bid requests based on a last winner's bid amount when all COTs requested in the plurality of bid requests do not have a corresponding winning bid in the list of bid requests. In embodiments, executing the algorithmic distribution application includes distributing the allocated COTs in the list of bid requests to each bidder associated with each bid request in the list of bid request to which a COT has been allocated.

In still another embodiment, a system for intelligently managing distribution of COTs via online auctions is provided. The system comprises at least one processor and a memory operably coupled to the at least one processor and storing processor-readable code that, when executed by the at least one processor, is configured to perform operations. The operations include receiving a plurality of bid requests from a plurality of bidders, each bid request of the plurality of bid requests requesting one or more COTs of a plurality of available COTs for distribution. In embodiments, each of the one or more COTs represents an underlying commodity, and each bid of the plurality bid requests includes a minimum bid amount and a maximum bid amount corresponding to each of the one or more COTs. The operations also include executing an algorithmic distribution application configured to manage distribution of the plurality of available COTs based on the plurality of bid requests. In embodiments, executing the algorithmic distribution application includes aggregating each of the plurality of bid requests from the plurality of bidders into a list of bid requests and determining whether a total number of COTs requested in the plurality of bid requests is more than a total number of COTs in the plurality of available COTs. In embodiments, executing the algorithmic distribution application includes, when the total number of COTs requested in the plurality of bid requests is not more than the total number of COTs in the plurality of available COTs, allocating COTs of the plurality of available COTs to each of the plurality of bidders based on the one or more COTs requested in the bid request received from each respective bidder of the plurality of bidders, and determining a price for each of the allocated COTs based on the minimum bid amount in the bid request corresponding to the allocated COT for the bid request. In embodiments, executing the algorithmic distribution application includes, when the total number of COTs requested in the plurality of bid requests is more than the total number of COTs in the plurality of available COTs, sorting the list of bid requests based on the maximum bid amount in each of the bid requests in the list of bid requests, further sorting the list of bid requests based on a placement time each of the bid requests in the list of bid requests was placed such that a first bid request having a maximum bid amount equal to a maximum bid amount of a second bid request and a placement time earlier than the second bid request is sorted above the second bid request, allocating COTs of the plurality of available COTs to each bid request in the list of bid requests based on the sorting order of each bid request, determining a price for each of the COTS allocated to each bid request in the list of bid requests, where determining the price includes determining the price for each of the COTS allocated to each bid request in the list of bid requests based on a first loser's bid amount when all COTs requested in the plurality of bid requests have a corresponding winning bid in the list of bid requests, and determining the price for each of the COTS allocated to each bid request in the list of bid requests based on a last winner's bid amount when all COTs requested in the plurality of bid requests do not have a corresponding winning bid in the list of bid requests. In embodiments, executing the algorithmic distribution application includes distributing the allocated COTs in the list of bid requests to each bidder associated with each bid request in the list of bid request to which a COT has been allocated.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1A:
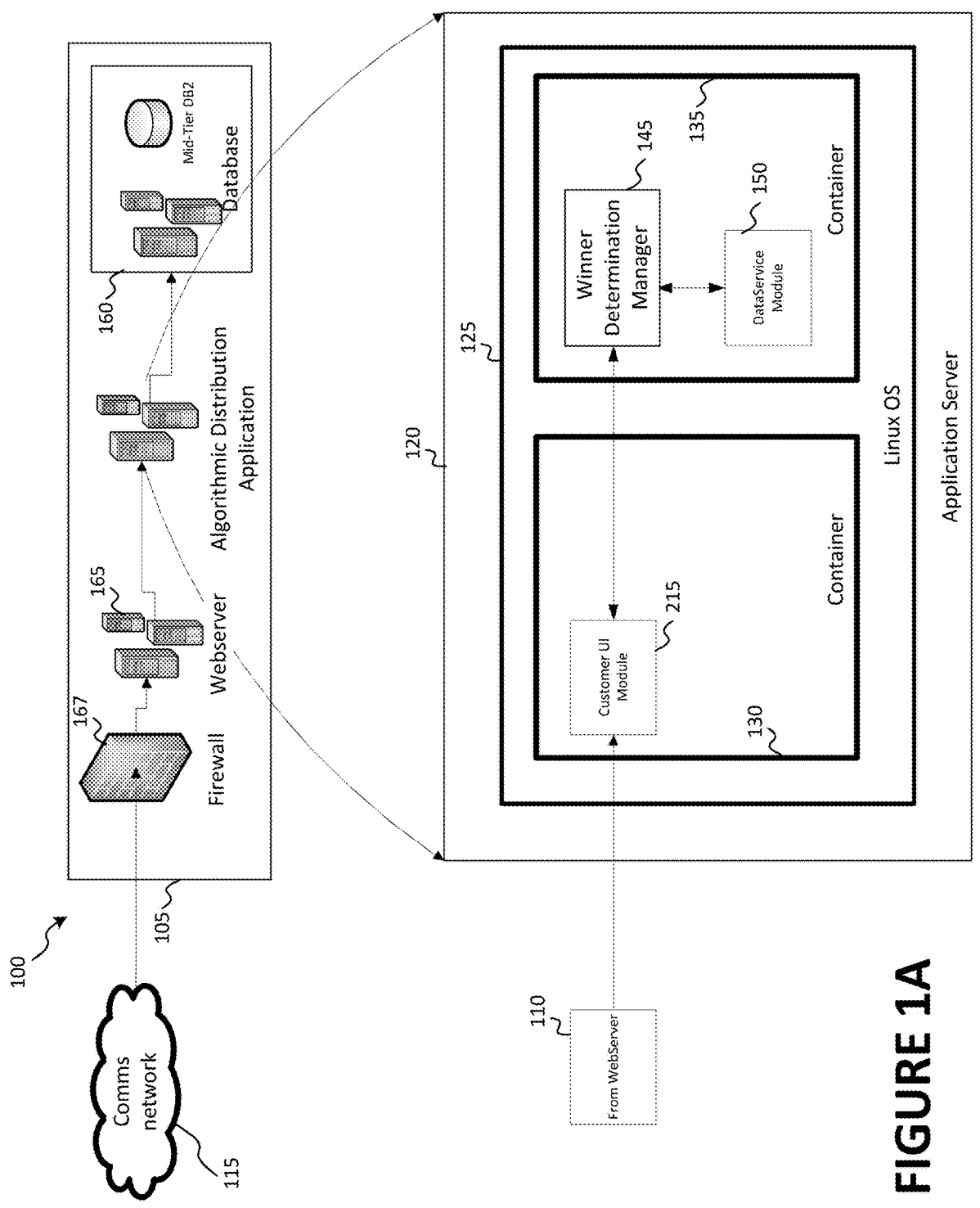
FIG. 1A is a high-level block diagram of a representative system for intelligently managing distribution of certificates of transportation (COTs) via online auctions according to embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for intelligently managing distribution of certificates of transportations (COTs). The present disclosure provides for a system integrated into a practical application with meaningful limitations that may enable the algorithmic management of distribution of available COTs via online auctions. In particular embodiments, an application server may operate to perform execution of an algorithmic distribution application configured to manage distribution of the available COTs based on a plurality of bid requests received from a plurality of bidders. The algorithmic distribution application may include functionality to not merely determine a winner of an online auction by determining a bidder that placed the largest bid, but rather may include functionality to intelligently determine whether all available COTs have been requested or not, and to adjust the allocation of the available COTs to the requesting bidders according to the availability of the COTs, as well as to dynamically determine a price of the allocated COTs, which may not always be a maximum bid of the winning bid (e.g., as in a typical online auction system) but may be adjusted based on the allocation of the available COTs to the requested bids.

FIGS. 1 through 4, discussed below, and the various embodiments used to describe the principles of the present disclosure in this patent document are by way of illustration only and should not be construed in any way to limit the scope of the present disclosure. Those skilled in the art can understand that the principles of the present disclosure may be implemented in any type of suitably-arranged device or system.

FIG. 1A illustrates an example system 100 for intelligently managing distribution of COTs via online auctions implemented in accordance with embodiments of the present disclosure. The embodiment of system 100 is by way of illustration and should not be construed as limiting in any way or form. FIG. 1A does not limit the scope of this disclosure to any particular implementation of a COT distribution management system.

As shown in FIG. 1A, system 100 includes platform 105, user webserver 110, and communications network 115. Platform 105 may include algorithmic distribution application 120, database 160, web server 165, and firewall 167. In embodiments, the functionality of platform 105 may be provided by the cooperative operation of the various components of application platform 105 as described herein. In some embodiments, platform 105 may be provided to include multiple WAR files (modules) that may be deployed to containers (e.g., implemented as Tomcat containers). For example, platform 105 may include an algorithmic distribution application 120, which may include one or more containers.

Algorithmic distribution application 120 may include customer container 130 and client container 135. Customer container 130 may include customer user interface (UI) module 140. In embodiments, customer container 130 may be configured to provide access to the functionality of algorithmic distribution application 120 to a user for distributing COTs, such as to provide functionality for generating, structuring, rendering, and presenting a UI (e.g., via UI module 140) to a user (e.g., a customer wishing to bid on one or more auction listings for one or more available COTs).

Client container 135 may include winner determination manager 145 and data service module 150. In embodiments, client container 135 may be configured to provide access to the functionality of algorithmic distribution application 120 to an administrative user for distributing COTs, such as to provide functionality for generating, structuring, rendering, and presenting a UI (e.g., via UI module 140) to the administrative user for managing various aspects of algorithmic distribution application 120 (e.g., create, edit, manage, etc., auctions for available COTs).

In embodiments, winner determination manager 145 may include and/or may be configured to execute or apply algorithms, machine learning models, mathematical models, rules models, and/or other models that may be used to intelligently determine whether all available COTs have been requested or not, to intelligently adjust the allocation of the available COTs to the requesting bidders according to the availability of the COTs, and to intelligently and dynamically determine a price of the allocated COTs, which may not always be a maximum bid of the winning bid (e.g., as in a typical online auction system) but may be adjusted based on the allocation of the available COTs to the requested bids.

In embodiments, winner determination manager 145 may be implemented in a webservice application. Results from winner determination manager 145 may be used to configure and/or manage the distribution of available COTs. In some embodiments, the results from winner determination manager 145 may be stored in a data service application (e.g., data service module 150), which may include a database (e.g., database 160), such as a mid-tier DB2 database.

In embodiments, the functionality of algorithmic distribution application 120 may be provided by the cooperative operation of the various components of algorithmic distribution application 120, as will be described in more detail below. As shown in FIG. 1A, algorithmic distribution application 120 may be implemented in a server. Although algorithmic distribution application 120 is shown as a component, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1A illustrates components of algorithmic distribution application 120 as single and separate blocks, each of the various components of algorithmic distribution application 120 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of algorithmic distribution application 120 may actually be part of a different component of algorithmic distribution application 120, and as such, the description of the particular functionality described for the particular component of algorithmic distribution application 120 is for illustrative purposes and not limiting in any way. In some particular embodiments, algorithmic distribution application 120 may include a Linux-based server with a processor. In some embodiments, two matching algorithmic distribution applications 120 may be used in a production environment, configured to load balance all requests (e.g., bid requests). In some embodiments, each algorithmic distribution application 120 may house one or more containers 130 and 135, a customer container 130 for the customer UI and a client container 135 for other applications, including the winner determination manager 145.

In embodiments, algorithmic distribution application 120 may be implemented using a processor. The processor of algorithmic distribution application 120 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of the processor of algorithmic distribution application 120 may comprise code segments (e.g., software, firmware, and/or hardware logic) executable in hardware, such as a processor, to perform the tasks and functions described herein. In yet other embodiments, the processor of algorithmic distribution application 120 may be implemented as a combination of hardware and software.

In embodiments, communications network 115 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

Figure 1B:
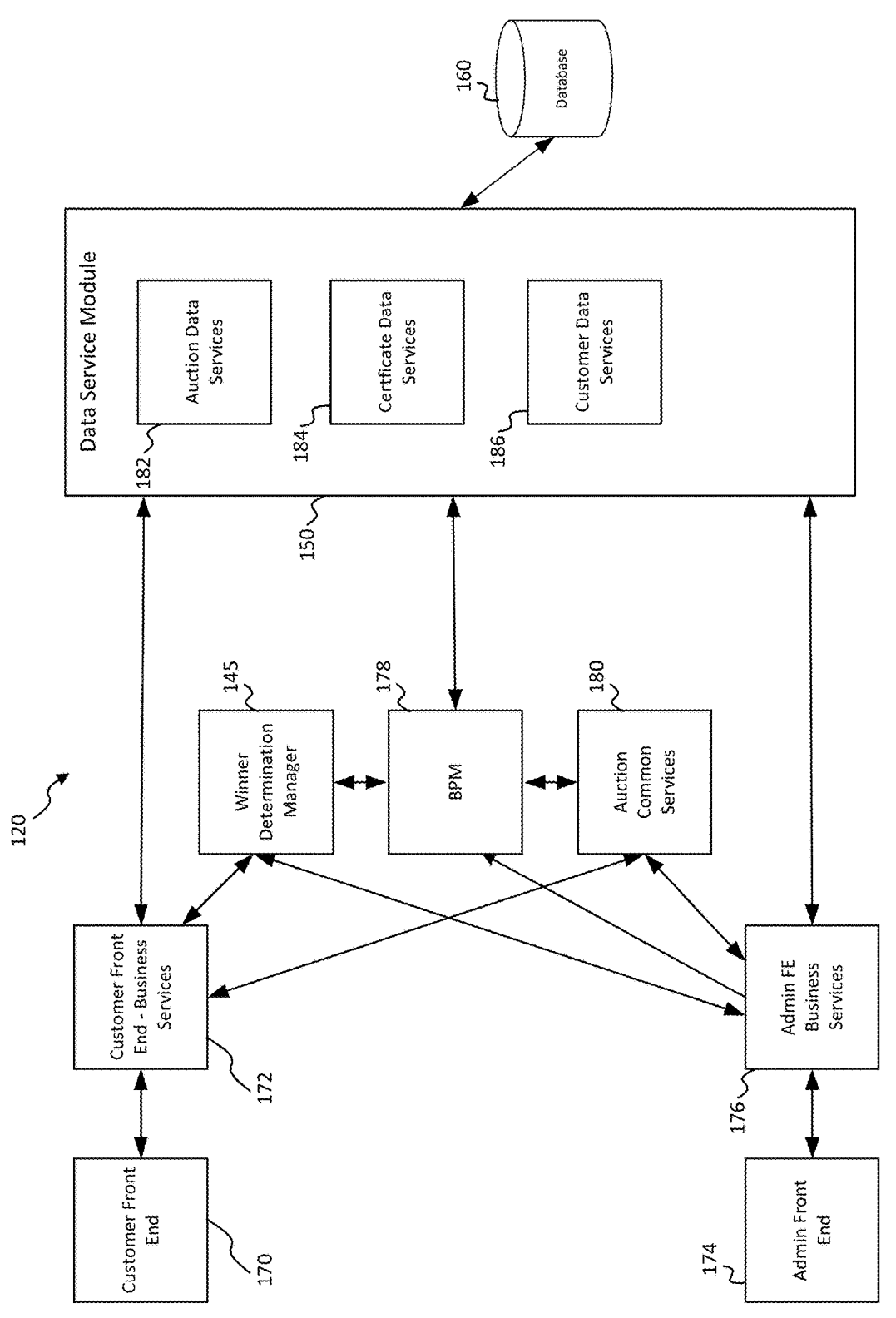
FIG. 1B is a block diagram illustrating functionality of an exemplary algorithmic distribution application 120 implemented in accordance with embodiments of the present disclosure.

FIG. 1B is a block diagram illustrating functionality of an exemplary algorithmic distribution application 120 implemented in accordance with embodiments of the present disclosure. In embodiments, the implementation of algorithmic distribution application 120 may be provided by the cooperative operation of the various functional components of algorithmic distribution application 120, as will be described in more detail below. For example, in embodiments, algorithmic distribution application 120 may be configured facilitate intelligent management of distribution of COTs via online auctions by providing functionality to manage the online auctions (e.g., providing mechanisms to create and/or edit auction listings for available COTs, to interface users to facilitate bidding on the auction listings, to make determinations as to how to allocate available COTs to bidders, and to provide the results of the operations for distribution of the COTs).

Algorithmic distribution application 120 may be configured to provide access to the functionality of algorithmic distribution application 120 to a user, such as a customer wishing to bid on one or more auction listings for one or more available COTs in an online auction. In embodiments, the functionality of algorithmic distribution application 120 to provide access to the functionality of algorithmic distribution application 120 to a user may be implemented by the cooperative operation of customer front end 170 and customer front end business services 172.

In embodiments, customer front end 170 may be configured to provide a UI that a user (e.g., a customer wishing to bid on one or more auction listings for one or more COTs) may use to obtain a list of the auction listings for available COTs, to select an auction listing, to place a bid on the auction listing, to monitor the status of the auction listing, to view the results of the auction listing, etc.

In embodiments, customer front end business services 172 may be configured to provide functionality to facilitate operations of customer front end 170. In embodiments, the functionality of customer front end business services 172 may be implemented as one or more services operating in algorithmic distribution application 120. Customer front end business services 172 may be configured to interact with data service module 150, winner determination manager 145, and other components of algorithmic distribution application 120. In embodiments, customer front end business services 172 may be implemented using various objects. For example, customer front end business services 172 may include an auction controller object that may implement various functions to control auctions, such as a fetch data model function, a get auctions function to retrieve a listing of available auction listings, etc. In some embodiments, customer front end business services 172 may include an auction service object that may implement various functions such as a build data model functions that may use the results of the fetch data model function to build a data model for an online auction. In some embodiments, customer front end business services 172 may include an UI layout controller object that may implement various functions to manage the layout of the user UI to be presented to a customer, such as a get screen layout function that may be used to obtain a configuration of the user UI layout. In some embodiments, customer front end business services 172 may include an offer business object that may implement various functions and structures that may be used to define an auction listing. For example, the offer business object may include structures related to an auction listing including an offer ID, a term of the auctions listing, a number of COTs being offered in the auction listing, a period of duration of the auction listing, a starting amount to indicate a minimum initial amount for the first bid accepted in the auction listing, a start time of the auction listing, an end time of the auction listing, an auction increment indicating a minimum amount that a new bid must raise a current bid in order to win the bid over the current bid, etc. The offer business object may include functions for defining the auction listing including a list bids function that may be used to obtain a list of auction listings for available COTs. In some embodiments, customer front end business services 172 may include a bid business object that may implement various functions and structures that may be used to define a bid for an auction listing. In embodiments, the bid business object may be used to define a bid placed by a user in a format that is compatible with algorithmic distribution application 120. For example, the bid business object may include structures related to a bid including a bid ID, a minimum bid amount of the bid, a maximum bid amount, a number of requested COTs in the bid, a number of COTs currently being won by the bid, a current bid amount indicating a current bid amount of the bid, a user ID, a bid time (e.g., a time/date that the bid was placed), etc. In some embodiments, customer front end business services 172 may include a COT business object that may implement various functions and structures that may be used to define a COT. The COT business object may be used to define COTs that may be indicated in the bid business object, the offer business object, and/or other components of algorithmic distribution application 120. For example, the COT business object may include structures related to a COT including a COT type for indicated a type of the COT, a COT number, a shipping period within which a COT may be distributed to a winner of the COT after the auction end time, an order number associated with the COT, etc.

In embodiments, algorithmic distribution application 120 may be configured to provide access to the functionality of algorithmic distribution application 120 to an administrative user for managing various aspects of algorithmic distribution application 120 functionality to intelligently manage distribution of available COTs. In embodiments, the functionality of algorithmic distribution application 120 to provide access to the functionality of algorithmic distribution application 120 to an administrative user may be implemented by the cooperative operation of admin front end 174 and admin front end business services 176.

In embodiments, admin front end 174 may be configured to provide a UI that an administrative user may use to manage various aspects of an online auction such as creating auction listings, edit auction listings, manage auction listings, issue COTs to winning bidders, etc.

In embodiments, admin front end business services 176 may be configured to provide functionality to facilitate operations of admin front end 174. In embodiments, the functionality of admin front end business services 225 may be implemented as one or more services operating in algorithmic distribution application 120. Admin front end business services 176 may be configured to interact with data service module 150, winner determination manager 145, and other components of algorithmic distribution application 120. In embodiments, admin front end business services 176 may be implemented using various objects. For example, admin front end business services 176 may include an admin auction controller object that may implement various functions to control auctions, such as a fetch data model function, an upload offers function implementing functionality for uploading auction listings (e.g., defining configuration of auction listings), a manual determine winner allowing an administrative user to manually select a winner of an auction listing, a manual issue COT allowing an administrative user to manually issue or distribute a COT, a manual create bid allowing an administrative user to manually create a bid to be placed in an auction listing, etc. In some embodiments, admin front end business services 176 may include an admin auction service object that may implement various functions such as a build data model functions that may use the results of the fetch data model function to build a data model for an online auction, a parse Excel function implementing functionality for parsing an uploaded spreadsheet of auction listings to be published in the online auction, a create offer function implementing functionality for creating an auction listing (e.g., in a spreadsheet of auction listings or a single auction listing specified by the admin user), an issue COT function implementing functionality allowing the administrative user to issue or distribute a COT to a customer (e.g., a winning bidder), a create bid function implementing functionality allowing an administrative user to manually create a bid, etc. In some embodiments, admin front end business services 176 may include an offer business object that may implement various functions and structures that may be used to define an auction listing. For example, the offer business object may include structures related to an auction listing including an offer ID, a term of the auctions listing, a number of COTs being offered in the auction listing, a period of duration of the auction listing, a starting amount to indicate a minimum initial amount for the first bid accepted in the auction listing, a start time of the auction listing, an end time of the auction listing, an auction increment indicating a minimum amount that a new bid must raise a current bid in order to win the bid over the current bid, etc. The offer business object may include functions for defining the auction listing including a list bids function that may be used to obtain a list of auction listings for available COTs. In some embodiments, admin front end business services 176 may include a bid business object that may implement various functions and structures that may be used to define a bid for an auction listing. In embodiments, the bid business object may be used to define a bid placed by a user in a format that is compatible with algorithmic distribution application 120. For example, the bid business object may include structures related to a bid including a bid ID, a minimum bid amount of the bid, a maximum bid amount, a number of requested COTs in the bid, a number of COTs currently being won by the bid, a current bid amount indicating a current bid amount of the bid, a user ID, a bid time (e.g., a time/date that the bid was placed), etc. In some embodiments, admin front end business services 176 may include a COT business object that may implement various functions and structures that may be used to define a COT. The COT business object may be used to define COTs that may be indicated in the bid business object, the offer business object, and/or other components of algorithmic distribution application 120. For example, the COT business object may include structures related to a COT including a COT type for indicated a type of the COT, a COT number, a shipping period within which a COT may be distributed to a winner of the COT after the auction end time, an order number associated with the COT, etc.

In embodiments, algorithmic distribution application 120 may be configured to provide functionality for providing common services associated with an online auction and various listings in the online auction. For example, in embodiments, the functionality of algorithmic distribution application 120 to provide common services associated with an online auction and various listings in the online auction may be implemented by the operation of auction common services 180. In embodiments, auction common services 180 may be implemented as one or more services operating in algorithmic distribution application 120. Auction common services 180 may be configured to interact with customer front end business services 172, admin front end business services 176, bid placement manager (BPM) 178, and/or other components of algorithmic distribution application 120. In embodiments, auction common services 180 may be implemented using various objects. For example, auction common services 180 may include an auction common controller object that may implement various functions associated with an online auction and/or auction listings, such as an issue COT function implementing functionality allowing the issuance or distribution of a COT to a customer (e.g., a winning bidder), etc. In some embodiments, auction common services 180 may include an offer business object that may implement various functions and structures that may be used to define an auction listing. For example, the offer business object may include structures related to an auction listing including an offer ID, a term of the auctions listing, a number of COTs being offered in the auction listing, a period of duration of the auction listing, a starting amount to indicate a minimum initial amount for the first bid accepted in the auction listing, a start time of the auction listing, an end time of the auction listing, an auction increment indicating a minimum amount that a new bid must raise a current bid in order to win the bid over the current bid, etc. The offer business object may include functions for defining the auction listing including a list bids function that may be used to obtain a list of auction listings for available COTs. In some embodiments, auction common services 180 may include a bid business object that may implement various functions and structures that may be used to define a bid for an auction listing. In embodiments, the bid business object may be used to define a bid placed by a user in a format that is compatible with algorithmic distribution application 120. For example, the bid business object may include structures related to a bid including a bid ID, a minimum bid amount of the bid, a maximum bid amount, a number of requested COTs in the bid, a number of COTs currently being won by the bid, a current bid amount indicating a current bid amount of the bid, a user ID, a bid time (e.g., a time/date that the bid was placed), etc. In some embodiments, auction common services 180 may include a COT business object that may implement various functions and structures that may be used to define a COT. The COT business object may be used to define COTs that may be indicated in the bid business object, the offer business object, and/or other components of algorithmic distribution application 120. For example, the COT business object may include structures related to a COT including a COT type for indicated a type of the COT, a COT number, a shipping period within which a COT may be distributed to a winner of the COT after the auction end time, an order number associated with the COT, etc.

In embodiments, algorithmic distribution application 120 may include BPM 178. BPM 178 may be configured to provide functionality for providing an interface for managing placement of bids in an auction and for providing results of auction listings to data service module 150. In embodiments, algorithmic distribution application 120 may include winner determination manager 145. Winner determination manager 145 may be configured to execute or apply algorithms, machine learning models, mathematical models, rules models, and/or other models that may be used to intelligently determine whether all available COTs have been requested or not, to intelligently adjust the allocation of the available COTs to the requesting bidders according to the availability of the COTs, and to intelligently and dynamically determine a price of the allocated COTs. Some functionality of winner determination manager 145 may be described in further detail below. In embodiments, winner determination manager 145 may be configured to interact with customer front end business services 172, admin front end business services 176, BPM 178, and/or other components of algorithmic distribution application 120. In embodiments, winner determination manager 145 may be implemented using various objects. For example, winner determination manager 145 may include a winner determination controller object that may implement various functions associated with determining auction listing winners, such as a determine live winner issue COT function implementing functionality to determine a winner in a live auction, determine blind winner issue COT function implementing functionality to determine a winner in a blind auction, etc. In some embodiments, winner determination manager 145 may include a winner determination service object that may implement various functions, such as a determine live winner issue COT function implementing functionality to determine a winner in a live auction, determine blind winner issue COT function implementing functionality to determine a winner in a blind auction, etc. In some embodiments, winner determination manager 145 may include an offer business object that may implement various functions and structures that may be used to define an auction listing. For example, the offer business object may include structures related to an auction listing including an offer ID, a term of the auctions listing, a number of COTs being offered in the auction listing, a period of duration of the auction listing, a starting amount to indicate a minimum initial amount for the first bid accepted in the auction listing, a start time of the auction listing, an end time of the auction listing, an auction increment indicating a minimum amount that a new bid must raise a current bid in order to win the bid over the current bid, etc. The offer business object may include functions for defining the auction listing including a list bids function that may be used to obtain a list of auction listings for available COTs. In some embodiments, winner determination manager 145 may include a bid business object that may implement various functions and structures that may be used to define a bid for an auction listing. In embodiments, the bid business object may be used to define a bid placed by a user in a format that is compatible with algorithmic distribution application 120. For example, the bid business object may include structures related to a bid including a bid ID, a minimum bid amount of the bid, a maximum bid amount, a number of requested COTs in the bid, a number of COTs currently being won by the bid, a current bid amount indicating a current bid amount of the bid, a user ID, a bid time (e.g., a time/date that the bid was placed), etc.

In embodiments, algorithmic distribution application 120 may include data service module 150. As noted above, data service module 150 may be configured to receive results from auction listings and to store the results of the auction listings in database 160 for distribution to the winning bidders. In embodiments, data service module 150 may be implemented using various components. For example, data service module 150 may include auction data services 182, certificate data services 184, and customer data services 186.

In embodiments, auction data services 182 may be configured to provide functionality for managing aspects related to auction listing management. In embodiments, auction data services 182 may be implemented as one or more services operating in algorithmic distribution application 120. In embodiments, auction data services 182 may be implemented using various objects. For example, auction data services 182 may include a bid object defining a bid in an auction listing, an offer object defining an auction listing, a bid controller object that may be used to implement various functions associated with controlling a bid in an auction listing, such as a fetch bid function implementing functionality to obtain a bid object associated with a bid (e.g., a bid being placed or a previously placed bid), a new bid function implementing functionality to define a new bid placed or to be placed for an auction listing, an update bid function implementing functionality to update a previously placed bid, a delete bid function implementing functionality allowing deletion of a previously placed bid, etc. In some embodiments, auction data services 182 may include a bid service object that may implement various functions, such as a fetch bid function implementing functionality to obtain a bid object associated with a bid (e.g., a bid being placed or a previously placed bid), a new bid function implementing functionality to define a new bid placed or to be placed for an auction listing, an update bid function implementing functionality to update a previously placed bid, a delete bid function implementing functionality allowing deletion of a previously placed bid, etc. In embodiments, auction data services 182 may include an offer controller that may be used to implement various functions associated with controlling a COT offer in an auction listing, such as a fetch offer function implementing functionality to obtain an offer object associated with an offer of a COT in an auction listing, a new offer function implementing functionality to define a new offer for a COT in an auction listing, an update offer function implementing functionality to update an offer of a COT in an auction listing, a delete offer function implementing functionality allowing deletion of a previous offer of a COT in an auction listing, etc. In some embodiments, auction data services 182 may include an offer service object that may implement various functions, such as a fetch offer function implementing functionality to obtain an offer object associated with an offer of a COT in an auction listing, a new offer function implementing functionality to define a new offer for a COT in an auction listing, an update offer function implementing functionality to update an offer of a COT in an auction listing, a delete offer function implementing functionality allowing deletion of a previous offer of a COT in an auction listing.

In embodiments, certificate data services 184 may be configured to provide functionality for managing aspects related to COT management. In embodiments, certificate data services 184 may be implemented as one or more services operating in algorithmic distribution application 120. In embodiments, certificate data services 184 may be implemented using various objects. For example, certificate data services 184 may include a COT object defining a COT being offered or won in an auction listing, a corridor object defining a corridor associated with a COT in an auction listing, a COT controller object that may be used to implement various functions associated with management of a COT object in an auction listing, such as a fetch COT function implementing functionality to obtain a COT object, a new COT function implementing functionality to define a new COT to be offered in an auction listing, an update COT function implementing functionality to update a previously created COT object, a delete COT function implementing functionality allowing deletion of a previously created COT object, etc. In some embodiments, certificate data services 184 may include a COT service object that may be used to implement various functions, such as a fetch COT function implementing functionality to obtain a COT object, a new COT function implementing functionality to define a new COT to be offered in an auction listing, an update COT function implementing functionality to update a previously created COT object, a delete COT function implementing functionality allowing deletion of a previously created COT object, etc. In embodiments, certificate data services 184 may include a corridor controller object that may be used to implement various functions associated with management of a corridor associated with a COT object in an auction listing, such as a fetch corridor function implementing functionality to obtain a corridor object, a new corridor function implementing functionality to define a new corridor associated with a COT in an auction listing, an update corridor function implementing functionality to update a previously created corridor object, a delete corridor function implementing functionality allowing deletion of a previously created corridor object, etc. In some embodiments, certificate data services 184 may include a corridor service object that may be used to implement various functions, such as a fetch corridor function implementing functionality to obtain a corridor object, a new corridor function implementing functionality to define a new corridor associated with a COT in an auction listing, an update corridor function implementing functionality to update a previously created corridor object, a delete corridor function implementing functionality allowing deletion of a previously created corridor object.

In embodiments, customer data services 186 may be configured to provide functionality for managing aspects related to customer data management. In embodiments, certificate data services 184 may be implemented as one or more services operating in algorithmic distribution application 120. In embodiments, customer data services 186 may be implemented using various objects. For example, customer data services 186 may include a customer object defining a customer (e.g., a costumer placing bids in an auction listing), and a customer controller object that may be used to implement various functions associated with management of a customer object, such as a fetch customer function implementing functionality to obtain a customer object, a new customer function implementing functionality to define a new customer to be added to the system or a new customer in an auction listing, an update customer function implementing functionality to update a previously created customer object, a delete customer function implementing functionality allowing deletion of a previously created customer object, etc. In some embodiments, customer data services 186 may include a customer service object that may be used to implement various functions, such as a fetch customer function implementing functionality to obtain a customer object, a new customer function implementing functionality to define a new customer to be added to the system or a new customer in an auction listing, an update customer function implementing functionality to update a previously created customer object, a delete customer function implementing functionality allowing deletion of a previously created customer object, etc.

Figure 2A:
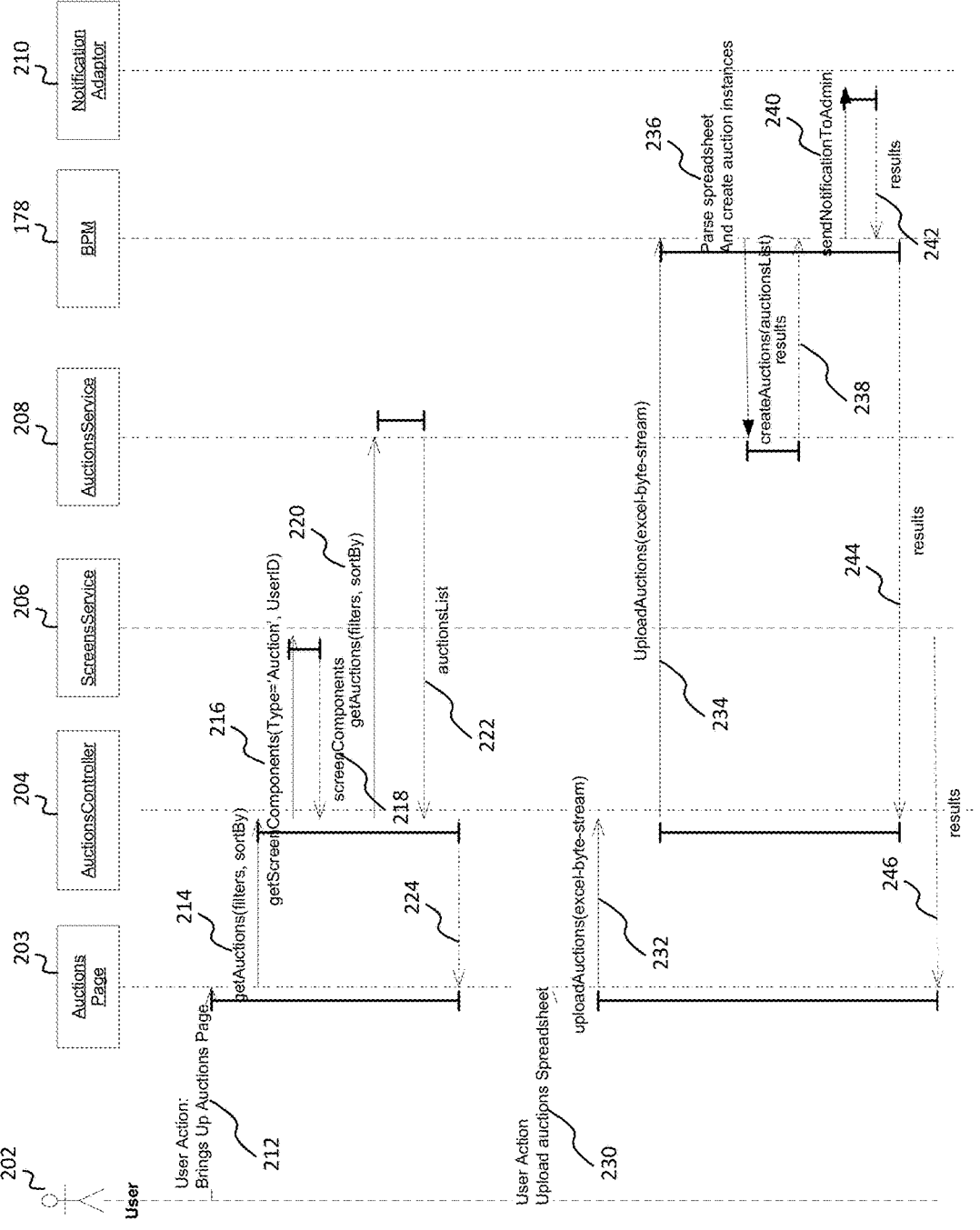
FIG. 2A is a block diagram illustrating exemplary operations of a system with functionality for intelligently managing distribution of COTs via online auctions implemented in accordance with embodiments of the present disclosure.

FIG. 2A is a block diagram illustrating exemplary operations of a system with functionality for intelligently managing distribution of COTs via online auctions implemented in accordance with embodiments of the present disclosure. FIG. 2A illustrates exemplary operations that may include a sequence of steps performed by a user 305 to leverage functionality of an algorithmic distribution application (e.g., algorithmic distribution application 120) in accordance with embodiments of the present disclosure. At step 212, user 202 may perform a user action to request an auctions page 203. In response to user 202's request for auctions page 203, at step 214, a function to obtain a listing of available auctions (e.g., getAuctions( )) may be executed against auctions controller 204 (e.g., an auctions controller object of a customer front end business server component of algorithmic distribution application 120 as illustrated in FIG. 2 above, or an admin auctions controller object of an admin front end business server component of algorithmic distribution application 120 as illustrated in FIG. 2 above). Auctions controller 204 may request, at step 216, from screens service 206, components of an auctions page to be displayed using a function (e.g., getScreenComponent( )) against screen service 206, specifying a type=Auction and providing a user ID. Screen service 206 may return, at step 218, in response to the getScreenComponent( ) function call, screen components of an auctions page to auctions controller 204 based on the type=auctions and user ID provided by auctions controller at step 216. At step 220, auctions controller 204 may request a list of available auctions from auctions service 208 (e.g., an auctions service object of a customer front end business server component of algorithmic distribution application 120 as illustrated in FIG. 2 above, or an admin auctions service object of an admin front end business server component of algorithmic distribution application 120 as illustrated in FIG. 2 above). Auctions service 208 may return, at step 222, a list of available auctions to auctions controller 204. At step 224, auctions controller 204 may return an auctions page (e.g., auctions page 203) to be presented to user 202 based on the screen components received from screen services 206 and the auction list received from auction service 208.

At step 230, user 202 may perform an administrative action to create one or more auctions or auction listings. In particular, in this example, user 202 may be an administrative user, and the action at step 230 may be related to creating one or more auction listings based on a configuration file (e.g., a spreadsheet including configuration for the one or more auction listings to be created). Thus, at step 230, user 202 may use a page (e.g., a page such as auctions page 203 or another administrative page configured to allow user 202 to upload an auctions configuration file) to upload an auctions configuration file (e.g., a spreadsheet such as an Excel spreadsheet including configuration for the one or more auction listings). At step 232, a function may be executed against auctions controller 204 to upload auction listings (e.g., uploadAuctions( )). At step 234, auctions controller 204 may execute a function (e.g., UploadAuctions( )) to upload auction listings against BPM 178. In response to the execution of the function to the upload auction listings, BPM 178 may parse, at step 236, the auctions configuration file and may instantiate an auction object. In some embodiments, the auction object may include a list of a one or more auction listings to be listed in accordance with the configuration in the auctions configuration file. At step 238, a function (e.g., createAuctions) may be executed against auctions service 208 to create an auction listing for each auction listings in the auction object created by BPM 178. The results of the function to create the auction listings may be returned from auctions service 208 to BPM 178. At step 240, BPM 178 may send a notification of the auction listings creation to a notification adaptor 210. In some embodiments, the notification may include an alert that may be sent to user 178, or other users, such as an administrative user. In embodiments, the results may also be returned, at step 242 to BPM 178, to auctions controller 204 at step 244, and to auctions page 203 for presentation to user 202 at step 246.

Figure 2B:
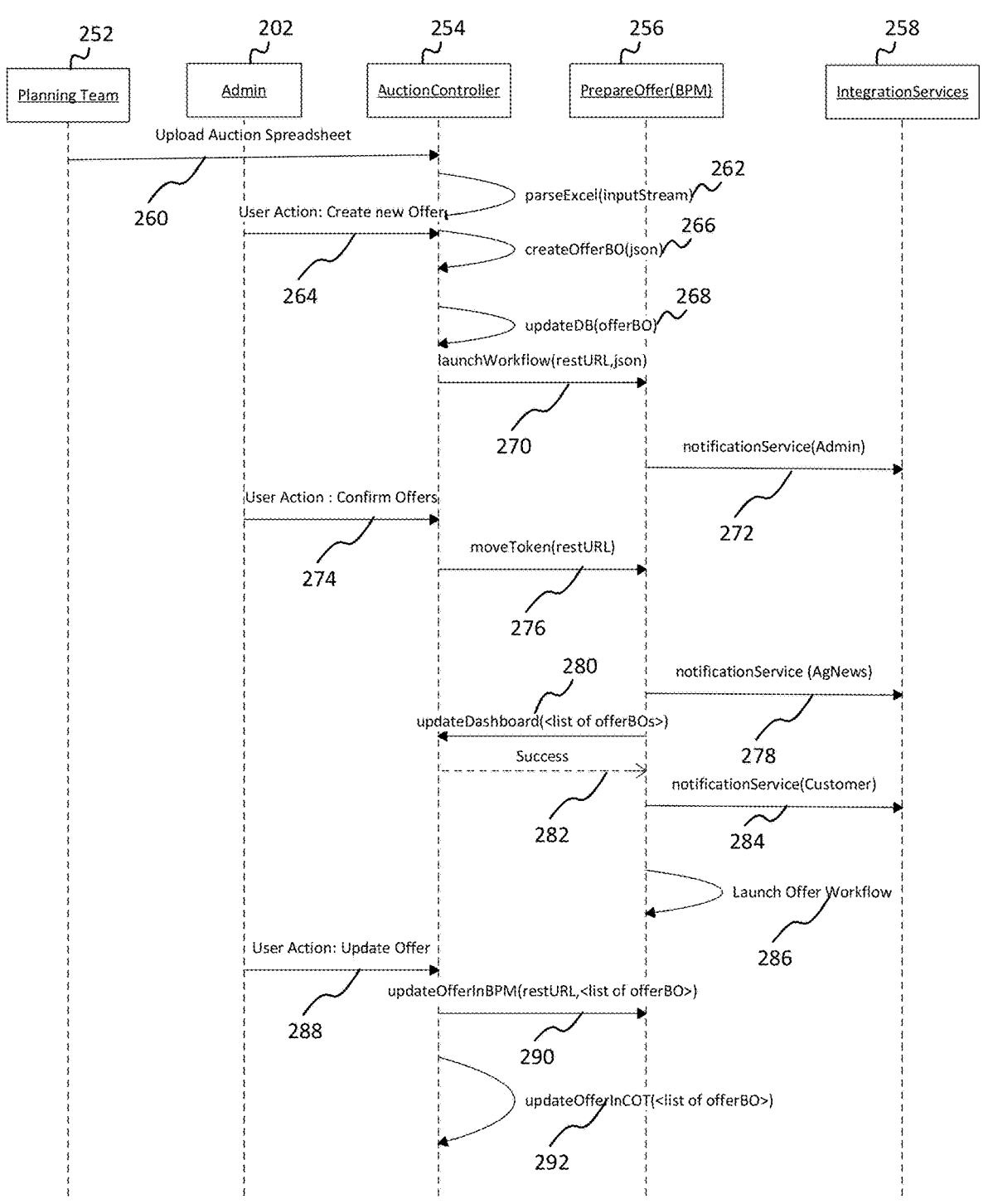
FIG. 2B is a block diagram illustrating exemplary operations of a system with functionality for intelligently managing distribution of COTs via online auctions implemented in accordance with embodiments of the present disclosure.

FIG. 2B is a block diagram illustrating exemplary operations of a system with functionality for intelligently managing distribution of COTs via online auctions implemented in accordance with embodiments of the present disclosure. FIG. 2B illustrates exemplary operations that may include a sequence of steps performed to leverage functionality of an algorithmic distribution application (e.g., algorithmic distribution application 120) in accordance with embodiments of the present disclosure. In particular, FIG. 2B illustrates exemplary operations that may include a sequence of steps performed to create offers for bidding on available COTs. At step 260, planning team may create or generate an auctions configuration file (e.g., a spreadsheet such as an Excel spreadsheet including configuration for one or more auction listings including an offer for one or more available COTs) and/or may upload the auctions configuration file to auction controller 254 (e.g., an admin auctions controller object of an admin front end business server component of algorithmic distribution application 120 as illustrated in FIG. 2 above). In response to the auctions configuration file being uploaded, auctions controller may parse (e.g., by executing a parsing function or logic) the auctions configuration file at step 262. At step 264, admin 202 may perform an action against auction controller 254 that may include a request to create a new offer (e.g., via execution of a function to create a new offer for each of the COT offered in the auction listings). In response to the request to create new offer, auction controller 254, at step 266, may create an offer business object for each of the COT offers, and at step 268 may update the database with the created offer business objects (e.g., database 160). At step 270, auction controller 254 may request a workflow to be launched by module 256, which may be a component of BPM 178 (e.g., via execution of a launchWorflow( ) function). At step 272, module 256 may request that integration service 258 provide a notification service associated with the launched workflow for creating the new COT offers.

At step 274, admin 202 may perform another user action that may include confirming the COT offers being created against auction controller 254. At step 276, auction controller 254 may execute a function to move a token against module 256. Module 256, at step 278, may request that integration service 258 provide a notification service associated with the moved token by module 256. At step 280, module 256 may request auction controller 254 to update a dashboard (e.g., by updating the list of offer business objects). Auction controller 254 may sent a success message to module 256 at step 282, and module 256, at step 284, may request that integration service 258 provide a notification service associated with the dashboard update. At step 286, module 256 may launch the offer workflow.

At step 288, admin 202 may perform another user action that may include updating a COT offer against auction controller 254. At step 290, auction controller 254, in response to receiving the request from admin 202 to update a COT offer, may execute a function to update an offer against module 256. In this case, the function may include a listing of the offer business object associated with the COT offer being updated. At step 292, auction controller 254 may execution a function to update the COT offer.

Figure 3:
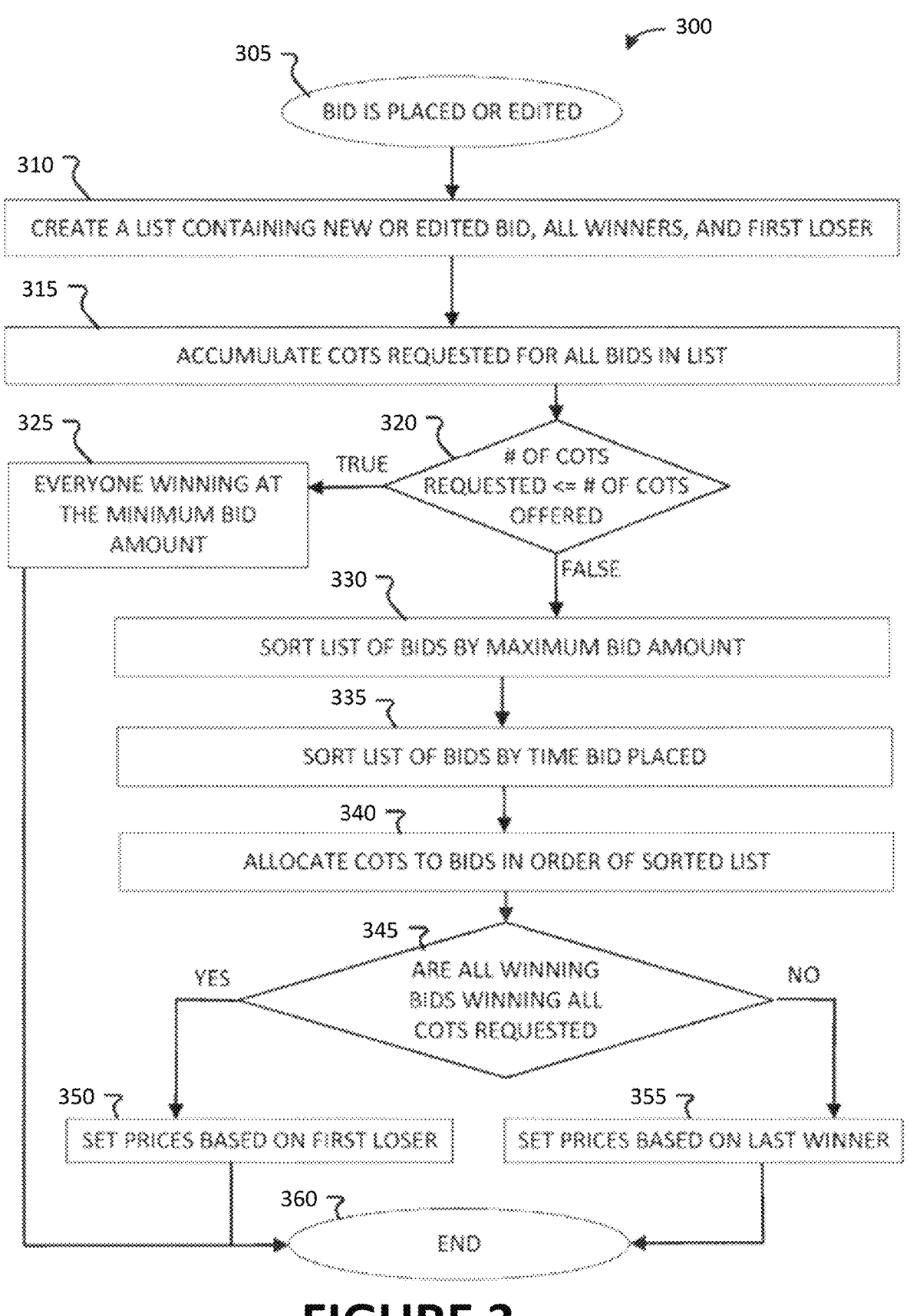
FIG. 3 is a flow diagram of a representative method 300 for intelligently managing distribution of COTs via online auctions implemented in accordance with embodiments of the present disclosure.

FIG. 3 is a flow diagram of a representative method 300 for intelligently managing distribution of COTs via online auctions implemented in accordance with embodiments of the present disclosure. In embodiments, the steps of method 300 may be implemented by functionality of various components of system 100. For example, in particular, functionality of winner determination manager 145 may allow system 100 to execute the steps of method 300 for intelligently managing distribution of COTs via online auctions implemented in accordance with embodiments of the present disclosure, such as by enabling management of distribution of available COTs based on received bid requests in an online auction. As also noted above, winner determination manager 145 may include algorithms, machine learning models, mathematical models, rules models, and/or other models configured for providing functionality for system 100. In embodiments, steps of method 300 may be implemented as steps of the algorithms, machine learning models, mathematical models, rules models, and/or other models of winner determination manager 145.

At step 305, during operation, system 100 receives one or more bid requests from one or more bidders of an online auction for one or more available COTs. For example, one or more bidders may submit one or more bid requests, such as using a user terminal, and the one or more bid requests may be provided (e.g., via communications network 115) to network 105. In embodiments, each bid request may include a request for one or more COTs of the available COTs being distributed. In embodiments, each of the available COTs may represent an underlying commodity. In embodiments, a bid request may include a new bid (e.g., a bid request) or may include a bid edit (e.g., an edit of a previously submitted bid request). In embodiments, each bid request may include a minimum bid amount a bidder is willing to pay for the COT requested in the bid request, and a maximum bid amount the bidder is willing to pay for the COT requested in the bid request. In embodiments, potential bidders may find available COTs that are being auctioned and place a bid request for one or more of the available COTs.

In embodiments, during operation, system 100 executes an algorithmic distribution application (winner determination manager 145 of FIG. 1) configured to manage distribution of the available COTs based on the bid requests received from the bidders. For example, at step 310, the algorithmic distribution application, such via execution or application of an algorithm, a machine learning model, a mathematical model, a rules models, etc., aggregates each of the bid requests received from the bidders into a list of bid requests. In embodiments, the list of bid requests may include all bid requests (e.g., new bids and edited bids) from all bidders. In embodiments, the list of bid requests may also include all winners of at least one offered auction listing, and a first loser (e.g., a bidder just below the last winner, such as by bid amount or by time). The list of bid requests may be created once a bid request is placed or received, or once a COTs auction listing time has ended or expired. The list of bid requests may also be updated upon entering of a new bid or an edited bid. The list may include all of the new or edited bids, all the winning bids, and a first loser bid.

At step 315, the algorithmic distribution application includes all COTs requested in all bid requests in the list of bid requests. In embodiments, each bidder may request one or more COTs through the online bidding process by submitting a bid request for the one or more COTs during the online auction.

At step 320, the algorithmic distribution application determines whether the total number of COTs requested in the bid requests received from the bidders is more than the total number of available COTs. In response to a determination that the total number of COTs requested in the bid requests received from the bidders is less than or equal to the total number of available COTs being offered in the online auction or available for distribution, the algorithmic distribution application proceeds to step 325. In response to a determination that the total number of COTs requested in the bid requests received from the bidders is more than the total number of available COTs being offered in the online auction or available for distribution, the algorithmic distribution application proceeds to step 330.

At step 325, in response to a determination that the total number of COTs requested in the bid requests received from the bidders is less than or equal to the total number of available COTs being offered in the online auction or available for distribution, the algorithmic distribution application allocates COTs of the available COTs to each of the bidders based on the COTs requested in the respective bid requests (e.g., each bidder is allocated the COTs requested). In embodiments, the algorithmic distribution application also determines a price for each of the allocated COTs to the bidders based on the minimum bid amount in the bid request that requested the allocated COT. In this manner, each bidder is allocated a COT at a price corresponding to the minimum bid amount in the bid requested that requested the allocated COT. As such, the minimum bid amount in a bid request, for all bid requests, is determined as the winning bid amount for the bid request. In embodiments, all winners may be notified and the corresponding COTs may be distributed accordingly. The algorithmic distribution application may proceed to step 360.

At step 330, in response to a determination that the total number of COTs requested in the bid requests received from the bidders is more than the total number of available COTs being offered in the online auction or available for distribution, the algorithmic distribution application sorts the list of bid requests based on the maximum bid amount in each of the bid requests in the list of bid requests. In embodiments, sorting the bidders based on a maximum bid amount may enable the algorithmic distribution application to determine a first loser. For example, the algorithmic distribution application may determine the first loser as the bidder submitting a bid request with a maximum bid amount immediately below the last winning bid request according to the order in the sorted list of bid requests.

At step 335, the algorithmic distribution application performs a secondary or further sorting of the list of bid requests based on a placement time of the bid requests in the list of bid requests. For example, a first bid request having a maximum bid amount equal to a maximum bid amount of a second bid request but a placement time earlier than the second bid request may be sorted above the second bid request. In this manner, bid requests are further sorted based on the time a bid is entered to determine a winner between two maximum bids that may be equal but placed at different times, with the earlier-placed bid determined as the winner.

At step 340, the algorithmic distribution application allocates COTs of the available COTs to each bid request in the list of bid requests based on the sorting order of each bid request in the list of bid requests. In embodiments, before the specific price for the allocated COTs is set, winners of the COTs may be determined. In some embodiments, a threshold minimum bid amount may be used to filter out bid requests having a maximum bid amounts less than the threshold minimum bid amount for a requested COT.

In embodiments, the algorithmic distribution application determines a price for each of the COTS allocated to each bid request in the list of bid requests. Determining the price may include determining the price for each of the COTS allocated to each bid request in the list of bid requests based on whether all COTs requested in the bid requests received from the bidders have a corresponding winning bid in the list of bid requests.

For example, at step 345, the algorithmic distribution application determines whether all COTs requested in the bid requests received from the bidders have a corresponding winning bid in the list of bid requests. In response to a determination that all COTs requested in the bid requests received from the bidders have a corresponding winning bid in the list of bid requests, the algorithmic distribution application proceeds to step 350. In response to a determination that not all COTs requested in the bid requests received from the bidders have a corresponding winning bid in the list of bid requests, the algorithmic distribution application proceeds to step 355.

At step 350, the algorithmic distribution application determines the price for each of the COTS allocated to each bid request in the list of bid requests based on a first loser's bid amount when all COTs requested in the plurality of bid requests have a corresponding winning bid in the list of bid requests. For example, in embodiments, the price for each winning bidder may be set to equal the bid before the first loser. In these embodiments, a next winning bid price may be set to equal the first loser's maximum bid or the overall At step 360, the algorithmic distribution application causes distribution of the allocated COTs in the list of bid requests to each bidder associated with each bid request in the list of bid at prices determined in accordance with the steps of method 300.

Tables 1-3 below provide specific examples of the management and distribution process of available COTs in accordance with embodiments of the present disclosure. In particular, Tables 1-3 illustrate results of an online auction bidding process that may serve to illustrate the application of the functionality disclosed herein. It will be appreciated that the examples offered below are not intended to be limiting in any way, but rather are offered for illustrative purposes.

| Bidder Company Bidder Name | Status | COTs Requested COTs Winning | Bid Amount | Starting Bid Maximum Bid | Total Bid | BidTime |
|---|---|---|---|---|---|---|
| Company A | Won | 2 | $6,000 | $0 | $12,000 | 12:15:07 PM |
| 1ˢᵗ Bidder | | 2 | | $100,00 | | |
| Company B | Lost | 2 | $0 | $3,000 | $0 | 12:26:33 PM |
| 6ᵗʰBidder | | 0 | | $5,000 | | |
| Company C | Lost | 2 | $0 | $3,000 | $0 | 12:24:21 PM |
| 5ᵗʰ Bidder | | 0 | | $6,000 | | |
| Company D | Lost | 2 | $0 | $1 | $0 | 12:21:24 PM |
| 4th Bidder | | 0 | | $3,000 | | |
| Company E | Lost | 2 | $0 | $0 | $0 | 12:19:37 PM |
| 3rd Bidder | | 0 | | $1 | | |
| Company F | Lost | 2 | $0 | $0 | $0 | 12:18:02 PM |
| 2nd Bidder | | 0 | | | | | minimum bid amount, whichever is higher. In some embodiments, winning bids may be equal to the first loser's maximum bid amount, but the winning bid may have been placed before the first loser's bid. When the first loser's bid is determined to have been placed before the winner's bid, the price for a winning bid may be set to be the maximum of the first loser's bid plus a bid increment or the threshold minimum bid. When the bid increment is used, the price for a winning bid is not to be more than the winning bid's maximum bid amount.

At step 355, the algorithmic distribution application determines the price for each of the COTS allocated to each bid request in the list of bid requests based on a last winner's bid amount when all COTs requested in the plurality of bid requests do not have a corresponding winning bid in the list of bid requests. In embodiments, for all winning bids placed before the last winning bid, a price is set for a winning bid equal to the last winner's maximum bid amount or the overall bid amount, whichever is higher. For all winning bids placed after the last winning bid, a price is set for a winning bid equal to the last winner's maximum bid amount plus a bid increment or the overall minimum bid, whichever is higher. When the bid increment is used, the price for a winning bid is not to be more than the winning bid's maximum bid amount.

Table 1 illustrates an example in which two COTs are available for distribution. In this example, the two available COTs are offered via an online auction. Companies A-F submit bid requests requesting and bidding on the two available COTS. Because the bid request from company A was placed first, company A is the first bidder and the amount of the bid only matches the successive bids until a later bidder bids over the company A's maximum bid amount. In this case, company A has a maximum bid of $100,000 for both available COTs. For a later bidder to win the available COTs, a bid of over $100,000 would need to be placed.

The fifth bidder bids a maximum of $6,000 at a time after the first bidder (e.g., company A). Once the bid from the fifth bidder is placed and received, the winning bidders before this bid was placed would have to match the maximum bid amount of $6,000. In other words, the winning bid for Company A would be a maximum bid amount of $6,000. All of the other companies submit bids with maximum bid amounts lower than $6,000 and these would not be considered further in the bidding process. Company B places a bid after Company C, but the maximum bid is only $5,000. Because Company B's maximum bid is less than the winning bid, Company B's bids are out of contention.

In the end, Company A wins the request COTs at a bid amount of $6,000

TABLE #2

| Bidder Company Bidder Name | Status | COTs Requested COTs Winning | Bid Amount | Starting Bid Maximum Bid | Total Bid | BidTime |
|---|---|---|---|---|---|---|
| Company A | Won | 4 | $21,001 | $21,000 | $84,004 | 2:47:19 PM⁻ |
| 3rd Bidder | | 4 | | $21,500 | | |
| Company B | Won | 4 | $21,000 | $20,800 | $21,000 | 2:37:01 PM |
| 1st Bidder | | 1 | | $21 000 | | |
| Company C | Lost | 4 | $0 | $20,800 | $0 | 2:46˜43 PM |
| 2nd Bidder | | 0 | | $21.000 | | |

Table 2 illustrates an example in which five COTs are available for distribution. In this example, the five available COTs are offered via an online auction. Companies A-C are bidding on the five COTs available for distribution. In this example, Company B is the first bidder. Company B places a starting bid at $20,800 and a maximum bid amount of $21,000 for four of the available COTs. Company C is the second bidder and places a starting bid at $20,800 and a maximum bid amount of $21,000 for four of the available COTs. The maximum bid amounts from Companies B and C are equal match, but the bid requates from Company B was placed before the bid request from Company C. Company A's bid request is placed third, with a starting bid at $21,000 and a maximum bid amount of $21,500 for four of the available COTs.

For company A to win one or more of the available COTs, the maximum bid amount in the bid request from company A must exceed the maximum bid amount of other bidders by at least $1 because the bid request from company A was placed last. In this example, company A may win the four requested COT as the maximum bid amount in the bid request from company A exceeds the maximum bid amount in the bid requests from both company B and C. Company B's bid request was increased to the maximum bid amount in the bid request when the third bid was placed. Company B and Company C may have the same maximum bid amount, but Company B wins the remaining COT because the bid was placed first. Company C's bid was increased up to the maximum by the bids from Company A. A tie is won by the earlier bid time, which means that Company B is the winner of the remaining COT that company A did not bid on.

TABLE #3

| Bidder Company Bidder Name | Status | COTs Requested COTs Winning | Bid Amount | Starting Bid Maximum Bid | Total Bid | BidTime |
|---|---|---|---|---|---|---|
| Company A | Won | 1 | $20,800 | $20.800 | $20,800 | 3:47:32 AM |
| 1st Bidder | | 1 | | $20,800 | | |
| Company B | Lost | 1 | $0 | $20.800 | $20,800 | 3:58:47 AM |
| 1st Bidder | | 0 | | $20,800 | | |

Table 3 illustrates an example in which one COT is available for distribution. In this example, the available COT is offered via an online auction listing. In this example, Company A is the first bidder and places a starting bid at $20,800 and a maximum bid amount of $20,800. Company B is the second bidder and also places a starting bid at $20,800 and a maximum bid amount of $20,800. Because the maximum amounts of the bids for Company A and Company B are the same, the winner is chosen based on the time of the bid. Company A is the first bidder and is therefore awarded the available COT.

Figure 4:
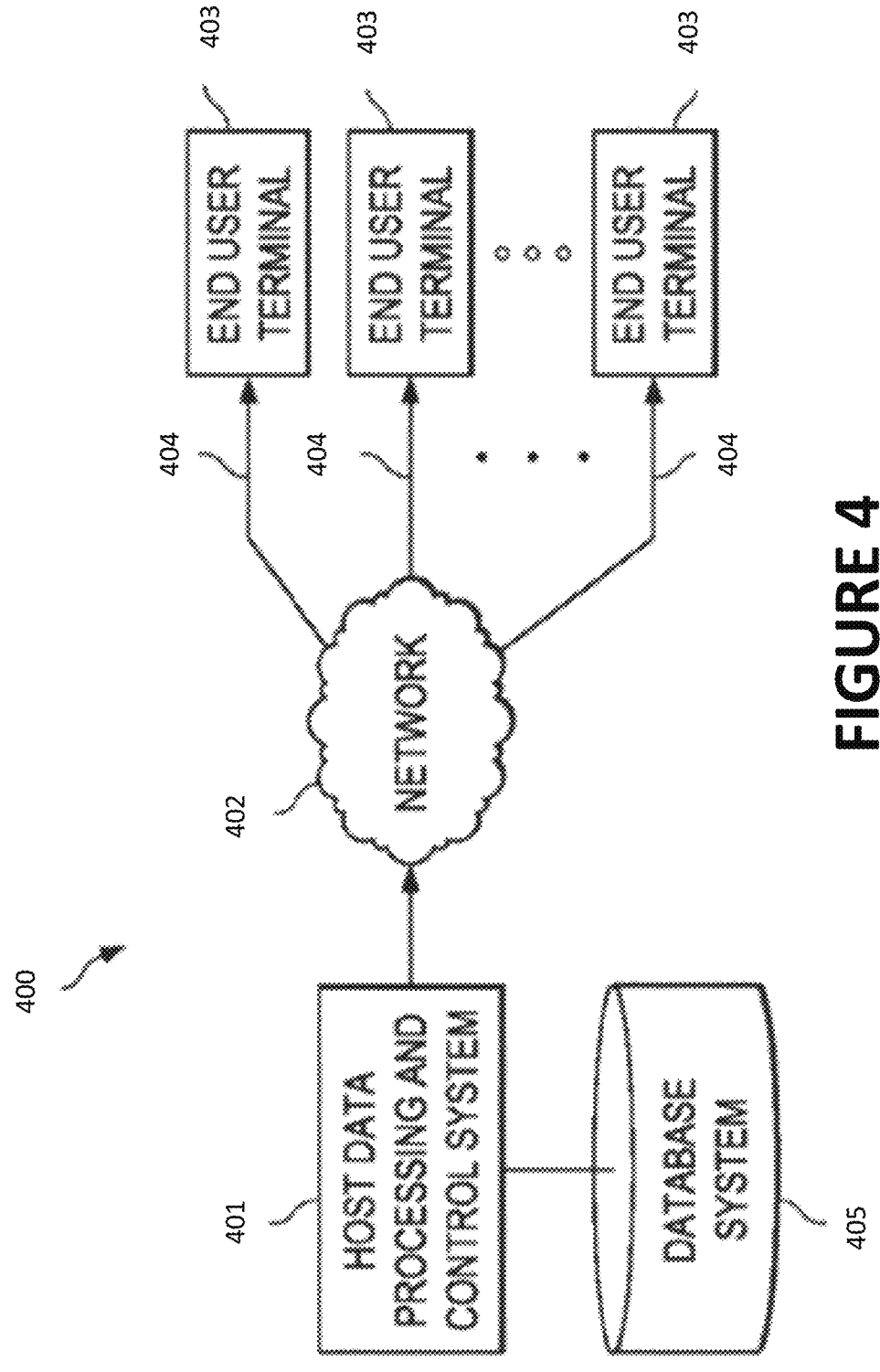
FIG. 4 illustrates an exemplary high level functional block diagram illustrating a representative computer network operating environment for intelligently managing distribution of COTs implemented according to embodiments of the present disclosure.

FIG. 4 illustrates an exemplary high level functional block diagram illustrating a representative computer network operating environment for intelligently managing distribution of COTs implemented according to embodiments of the present disclosure. In the illustrated embodiment, system 400 is based on a host data processing and control system (server) 401 and a global network 402, such as the Internet. Global network 402 could also be a private, organizational, or governmental computer-based network known in the art, such as a wide area network (WAN) or local area network (LAN). The interconnections between the operational blocks shown in system 400 shown in FIG. 4 can be implemented by hardwired connections, wireless connections, or a combination of the two.

Generally, the application of the principles of the present disclosure is independent of the high-level architecture and high-level hardware-software implementation of system 400. System 400 allows a user (e.g., a railroad customer or railroad) to monitor and manage certificates of transportation using an end user terminal 403, railroad host server 401 and associated database 405, communications interconnections 404, and network 402. End user terminals 403, may be, for example, a desk top computer, laptop computer, tablet, mobile phone, or similar conventional computing-communications device, which supports standard network interfacing through browsers or applications. In the typical operating environment, system 400 will have multiple users, including those employed by the railroad and those employed by the customer, and a corresponding number of end user terminals 403, although only three end user terminals 403, and a corresponding number of communications interconnections 404, are shown in FIG. 4 for reference.

The subsystems of system 400, including railroad host server 401, database 405, and communications interconnections 404 are preferably based on hardware and software systems known in the art, including computers, servers, processors, displays, and communications systems. Depending on the particular configuration of system 400 being employed, the base hardware and software can be, in whole or in part, localized (e.g., at a geographically centralized data center) or distributed (e.g., at multiple geographically-diverse processing nodes).

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). For example, the terms "processor" and "controller" can be a class of structures, rather than one specific structure, and may be defined with functional terms, but that does not make it means-plus-function. Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-4 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. The terms Disk and disc can include compact disc (CD), laser disc, optical disc, digital versatile disc (DVD), floppy disk, and Blu-ray disc where disks usually reproduce data magnetically, while discs usually reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function, in substantially the same way, or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An intelligent certificate of transportation (COT) distribution management system, comprising:

a first algorithmic distribution application server including at least one processor and coupled to a first memory, the processor configured to execute machine-readable instructions to perform a first set of program steps for implementing a first algorithmic distribution application; and a second algorithmic distribution application server including at least one processor and coupled to a second memory, the at least one configured to perform a second set of program steps for implementing a second algorithmic distribution application, wherein implementation of the first algorithmic distribution application in the first algorithmic distribution application server and the second algorithmic distribution application in the second algorithmic distribution application server is configured to distribute a plurality of bid requests received by the intelligent COT distribution management system over the first algorithmic distribution application and the second algorithmic distribution application to load balance the plurality of bid requests through the first algorithmic distribution application server and the second algorithmic distribution application server, wherein the first set of program steps and the second set of program steps comprise:

receiving the plurality of bid requests from a plurality of bidders, each bid request of the plurality of bid requests requesting one or more COTs of a plurality of available COTs for distribution, wherein each of the one or more COTs represents an underlying commodity, and wherein each bid request of the plurality bid requests includes a minimum bid amount and a maximum bid amount corresponding to each of the one or more COTs;

executing an algorithmic distribution application configured to manage distribution of the plurality of available COTs based on the plurality of bid requests, wherein executing the algorithmic distribution application includes:

aggregating each of the plurality of bid requests from the plurality of bidders into a list of bid requests;

determining whether a total number of COTs requested in the plurality of bid requests is more than a total number of COTs in the plurality of available COTs;

when the total number of COTs requested in the plurality of bid requests is not more than the total number of COTs in the plurality of available COTs:

allocating COTs of the plurality of available COTs to each of the plurality of bidders based on the one or more COTs requested in the bid request received from each respective bidder of the plurality of bidders; and determining a price for each of the allocated COTs based on the minimum bid amount in the bid request corresponding to the allocated COT for the bid request;

when the total number of COTs requested in the plurality of bid requests is more than the total number of COTs in the plurality of available COTs:

sorting the list of bid requests based on the maximum bid amount in each of the bid requests in the list of bid requests;

further sorting the list of bid requests based on a placement time each of the bid requests in the list of bid requests was placed such that a first bid request having a maximum bid amount equal to a maximum bid amount of a second bid request and a placement time earlier than the second bid request is sorted above the second bid request;

allocating COTs of the plurality of available COTs to each bid request in the list of bid requests based on the sorting order of each bid request; and determining a price for each of the COTS allocated to each bid request in the list of bid requests, wherein determining the price includes:

determining the price for each of the COTS allocated to each bid request in the list of bid requests based on a first loser's bid amount when all COTs requested in the plurality of bid requests have a corresponding winning bid in the list of bid requests; and determining the price for each of the COTS allocated to each bid request in the list of bid requests based on a last winner's bid amount when all COTs requested in the plurality of bid requests do not have a corresponding winning bid in the list of bid requests; and distributing the allocated COTs in the list of bid requests to each bidder associated with each bid request in the list of bid request to which a COT has been allocated.

2. The COT distribution management system of claim 1, wherein each bid request in the plurality of bid requests includes one or more of a new bid request and an edit of a previously submitted bid request.

3. The COT distribution management system of claim 1, further comprising filtering, via the algorithmic distribution application, bid requests having a maximum bid amount that is less than a minimum threshold bid amount.

4. The COT distribution management system of claim 1, wherein determining the price for each of the COTS allocated to each bid request in the list of bid requests based on a first loser's bid amount includes determining the price for each of the COTS allocated to each bid request in the list of bid requests to be equal to a maximum bid amount in a bid requested before the first loser's bid amount according to the order of bid requests in the list of bid requests.

5. The COT distribution management system of claim 4, wherein a next winning bid amount is equal to the first loser's amount or a minimum threshold bid amount.

6. The COT distribution management system of claim 5, wherein a next winning bid amount is the higher of the first loser's amount or the minimum threshold bid amount.

7. The COT distribution management system of claim 1, wherein determining the price for each of the COTS allocated to each bid request in the list of bid requests based on a last winner's bid amount includes instantiating a price based on a first winner by setting the price for each of the COTS allocated to each bid request in the list of bid requests to be equal to the last winner's maximum bid amount or a minimum threshold bid amount.

8. The COT distribution management system of claim 7, wherein the price for each of the COTS allocated to each bid request in the list of bid requests is set to the higher of the last winner's bid amount or the minimum threshold bid amount.

9. The COT distribution management system of claim 1, wherein instantiating the price based on the first winner includes setting the price for each of the COTS allocated to each bid request in the list of bid requests with a placement time after the last winner to be equal to the last winner's maximum bid amount plus a bid increment or the minimum threshold bid amount.

10. The COT distribution management system of claim 8, wherein the price for each of the COTS allocated to each bid request in the list of bid requests is limited to no more than the maximum bid amount in each respective bid request.

11. The COT distribution management system of claim 1, further comprising an admin terminal configured to:

display a first action list when a transaction is pending review, the first action list comprising a clickable edit action link, a clickable cancel action link, and a clickable schedule action link; and display a second action list when the transaction is live, the second action list comprising a clickable extend schedule action link and a clickable create bid action link.

12. A method of intelligently managing distribution of certificates of transportation (COTs), comprising:

receiving a plurality of bid requests from a plurality of bidders, each bid request of the plurality of bid requests requesting one or more COTs of a plurality of available COTs for distribution, wherein each of the one or more COTs represents an underlying commodity, and wherein each bid request of the plurality bid requests includes a minimum bid amount and a maximum bid amount corresponding to each of the one or more COTs;

load balancing the plurality of bid requests over a distributed application server, wherein load balancing the plurality of bid requests over the distributed application server includes distributing the plurality of bid requests over a first algorithmic distribution application implemented in a first algorithmic distribution application server of the distributed application server and a second algorithmic distribution application implemented in a second algorithmic distribution application server of the distributed application server, wherein the first algorithmic distribution application and the second algorithmic distribution application are coupled to a database;

executing an algorithmic distribution application configured to manage distribution of the plurality of available COTs based on the plurality of bid requests, wherein executing the algorithmic distribution application includes:

aggregating each of the plurality of bid requests from the plurality of bidders into a list of bid requests;

determining whether a total number of COTs requested in the plurality of bid requests is more than a total number of COTs in the plurality of available COTs;

when the total number of COTs requested in the plurality of bid requests is not more than the total number of COTs in the plurality of available COTs:

allocating COTs of the plurality of available COTs to each of the plurality of bidders based on the one or more COTs requested in the bid request received from each respective bidder of the plurality of bidders; and determining a price for each of the allocated COTs based on the minimum bid amount in the bid request corresponding to the allocated COT for the bid request;

when the total number of COTs requested in the plurality of bid requests is more than the total number of COTs in the plurality of available COTs:

sorting the list of bid requests based on the maximum bid amount in each of the bid requests in the list of bid requests;

further sorting the list of bid requests based on a placement time each of the bid requests in the list of bid requests was placed such that a first bid request having a maximum bid amount equal to a maximum bid amount of a second bid request and a placement time earlier than the second bid request is sorted above the second bid request;

allocating COTs of the plurality of available COTs to each bid request in the list of bid requests based on the sorting order of each bid request;

determining a price for each of the COTS allocated to each bid request in the list of bid requests, wherein determining the price includes:

determining the price for each of the COTS allocated to each bid request in the list of bid requests based on a first loser's bid amount when all COTs requested in the plurality of bid requests have a corresponding winning bid in the list of bid requests; and determining the price for each of the COTS allocated to each bid request in the list of bid requests based on a last winner's bid amount when all COTs requested in the plurality of bid requests do not have a corresponding winning bid in the list of bid requests; and distributing the allocated COTs in the list of bid requests to each bidder associated with each bid request in the list of bid request to which a COT has been allocated.

13. The method of claim 12, further comprising filtering, via the algorithmic distribution application, bid requests having a maximum bid amount that is less than a minimum threshold bid amount.

14. The method of claim 12, wherein determining the price for each of the COTS allocated to each bid request in the list of bid requests based on a first loser's bid amount includes determining the price for each of the COTS allocated to each bid request in the list of bid requests to be equal to a maximum bid amount in a bid requested before the first loser's bid amount according to the order of bid requests in the list of bid requests.

15. The method of claim 14, wherein a next winning bid amount is equal to the first loser's amount or a minimum threshold bid amount.

16. The method of claim 15, wherein a next winning bid amount is the higher of the first loser's amount or the minimum threshold bid amount.

17. The method of claim 12, wherein determining the price for each of the COTS allocated to each bid request in the list of bid requests based on a last winner's bid amount includes instantiating a price based on a first winner by setting the price for each of the COTS allocated to each bid request in the list of bid requests to be equal to the last winner's maximum bid amount or a minimum threshold bid amount.

18. The method of claim 17, wherein the price for each of the COTS allocated to each bid request in the list of bid requests is set to the higher of the last winner's bid amount or the minimum threshold bid amount.

19. The method of claim 12, wherein instantiating the price based on the first winner includes setting the price for each of the COTS allocated to each bid request in the list of bid requests with a placement time after the last winner to be equal to the last winner's maximum bid amount plus a bid increment or the minimum threshold bid amount.

20. A computer-based tool for intelligently managing distribution of certificates of transportation (COTs), the computer-based tool including non-transitory computer readable media having stored thereon computer code which, when executed by a processor, causes a computing device to perform operations comprising:

receiving a plurality of bid requests from a plurality of bidders, each bid request of the plurality of bid requests requesting one or more COTs of a plurality of available COTs for distribution, wherein each of the one or more COTs represents an underlying commodity, and wherein each bid request of the plurality bid requests includes a minimum bid amount and a maximum bid amount corresponding to each of the one or more COTs;

load balancing the plurality of bid requests over a distributed application server, wherein load balancing the plurality of bid requests over the distributed application server includes distributing the plurality of bid requests over a first algorithmic distribution application implemented in a first algorithmic distribution application server of the distributed application server and a second algorithmic distribution application implemented in a second algorithmic distribution application server of the distributed application server, wherein the first algorithmic distribution application and the second algorithmic distribution application are coupled to a database;

executing an algorithmic distribution application configured to manage distribution of the plurality of available COTs based on the plurality of bid requests, wherein executing the algorithmic distribution application includes:

aggregating each of the plurality of bid requests from the plurality of bidders into a list of bid requests;

determining whether a total number of COTs requested in the plurality of bid requests is more than a total number of COTs in the plurality of available COTs;

when the total number of COTs requested in the plurality of bid requests is not more than the total number of COTs in the plurality of available COTs:

allocating COTs of the plurality of available COTs to each of the plurality of bidders based on the one or more COTs requested in the bid request received from each respective bidder of the plurality of bidders; and determining a price for each of the allocated COTs based on the minimum bid amount in the bid request corresponding to the allocated COT for the bid request;

when the total number of COTs requested in the plurality of bid requests is more than the total number of COTs in the plurality of available COTs:

sorting the list of bid requests based on the maximum bid amount in each of the bid requests in the list of bid requests;

further sorting the list of bid requests based on a placement time each of the bid requests in the list of bid requests was placed such that a first bid request having a maximum bid amount equal to a maximum bid amount of a second bid request and a placement time earlier than the second bid request is sorted above the second bid request;

allocating COTs of the plurality of available COTs to each bid request in the list of bid requests based on the sorting order of each bid request;

determining a price for each of the COTS allocated to each bid request in the list of bid requests, wherein determining the price includes:

determining the price for each of the COTS allocated to each bid request in the list of bid requests based on a first loser's bid amount when all COTs requested in the plurality of bid requests have a corresponding winning bid in the list of bid requests; and determining the price for each of the COTS allocated to each bid request in the list of bid requests based on a last winner's bid amount when all COTs requested in the plurality of bid requests do not have a corresponding winning bid in the list of bid requests; and distributing the allocated COTs in the list of bid requests to each bidder associated with each bid request in the list of bid request to which a COT has been allocated.

* * * * *